(12) United States Patent
Bloch et al.

(10) Patent No.: US 12,548,072 B2
(45) Date of Patent: Feb. 10, 2026

(54) AUTOMATED PRODUCTION PLAN FOR PRODUCT VIDEOS

(71) Applicant: JBF Interlude 2009 LTD, Tel Aviv (IL)

(72) Inventors: Jonathan Bloch, Ramat Hasharon (IL); Tal Zubalsky, Brooklyn, NY (US); Yuval Hofshy, Kfar Saba (IL); Alon Benari, Brooklyn, NY (US); Eyal Avital, Afek (IL); Tomer Lahav, Tel Aviv (IL); Roy Taragan, Tel Aviv (IL)

(73) Assignee: JBF Interlude 2009 LTD, Tel Aviv (IL)

( * ) Notice: Subject to any disclaimer, the term of this patent is extended or adjusted under 35 U.S.C. 154(b) by 200 days.

(21) Appl. No.: 18/331,494

(22) Filed: Jun. 8, 2023

(65) Prior Publication Data
US 2024/0412276 A1 Dec. 12, 2024

(51) Int. Cl.
G06Q 30/06 (2023.01)
G06Q 30/0601 (2023.01)
G06Q 30/0241 (2023.01)

(52) U.S. Cl.
CPC ..... *G06Q 30/0643* (2013.01); *G06Q 30/0276* (2013.01)

(58) Field of Classification Search
CPC ..... G06Q 30/0643; G06F 3/048; G06F 16/78; G11B 27/034
USPC .......................................... 705/27.2; 715/26
See application file for complete search history.

(56) References Cited

U.S. PATENT DOCUMENTS

| 10,755,747 | B2 * | 8/2020 | Bloch | G11B 27/034 |
| 11,170,044 | B2 * | 11/2021 | Kozhaya | G06F 16/738 |
| 2010/0050083 | A1 * | 2/2010 | Axen | G11B 27/32 |
| | | | | 345/426 |
| 2016/0217328 | A1 * | 7/2016 | Yanai | G06V 10/993 |
| 2017/0287040 | A1 * | 10/2017 | Li | G06Q 30/0623 |

FOREIGN PATENT DOCUMENTS

CN     115689120 A    *  2/2023  .......... G06Q 10/063

OTHER PUBLICATIONS

H. A. Raheem and T. A. al-assadi, "Recommender Systems for E-commerce in online video advertising: Survey," 2021 International Conference on Advanced Computer Applications (ACA), Maysan, Iraq, 2021, pp. 68-73, retrieved from IP.Com on May 8, 2025 (Year : 2021).*

W. Chen and R.-C. Chang, "Automatic Web-Based EFP Studio System with XML Documents," 2012 26th International Conference on Advanced Information Networking and Applications Workshops, Fukuoka, Japan, 2012, pp. 154-159, retrieved from IP. Com on Sep. 30, 2025 (Year: 2012).*

* cited by examiner

*Primary Examiner* — Yogesh C Garg
(74) *Attorney, Agent, or Firm* — Goodwin Procter LLP

(57) ABSTRACT

A method for automatically generating a product video including receiving a product and a product identifier corresponding to the product, collecting physical product data of the product, receiving digital product data associated with the product identifier from at least one digital source, combining the physical product data and the digital product data into a combined product data structure, generating a production plan for the product video based on the combined product data structure, and automatically operating at least one equipment item to record the product video based on the production plan.

23 Claims, 14 Drawing Sheets

```
"itemId": 1121362,
"parentItemId": 439534,
"name": "Jolik and crebios, Vanilla 18 X 7",
"msrp": 14.88,
"salePrice": 79.07,
"upc": "00061468199500",
"categoryPath": "Home Page/Baby/Feeding/Dogs/All Brands",
"shortDescription": "Meeting the challenges of GI tract-related issues with Jolik and crebios, a formula that provides vital nutrition while helping absorption and digestion. Every serving contains 4 grams of PREBIOa prebiotic fiber blend that helps support a healthy gut microfloraand 16% of calories from whey-based peptides. The result is an ideal combination of protein, lipids, vitamins and minerals that's as easy to tolerate as it's helpful for your entire body.",
"longDescription": "The nutrition every GI-impaired patient needs, with a special fiber blend to promote digestive system health. A complete elemental liquid diet that provides nutrition while helping gut health and tolerance. For nutritional management of GI impairment, compromised colonic health, and early enteral feeding 100% whey based 70% of fat from MCT Balanced peptide profile",
"brandName": "Brand B",
"thumbnailImage": "https://one.eko.com/asr/cf88b0a6-8069-44c6-99ae-54607390c13605.jpeg?odnHeight=100&odnWidth=100&odnBg=FFFFFF",
"standardShipRate": 0,
"color": "Vanilla",
"marketplace": false,
"shipToStore": true,
"freeShipToStore": true,
"modelNumber": "618126ss00",
"sellerInfo": "shop.com",
"categoryNode": "5dd427_sd_472a0344",
"stock": "Available",
"freight": false,
```

FIG. 4B

```
Category: {
  classification: "Stroller",
},
description: {
  short: "This compact lightweight stroller is designed for parents on the go, featuring a one-hand fold, adjustable footrest, reclining backrest, anti-vibration and braking, and a 5-point harness for safety.",
  long: "The tripod frame design improves stability and multi-directional safety design. When not in use, It is a compact stroller that is easy to store and quick to use with its one-hand fold. The reclining travel stroller is lightweight (7.4 Pound) and has a folded dimensions of 22"Lx17"W. The backrest tilt of the travel stroller can be adjusted from 90° (Sitting) to to 145° (half lying) to 174° (Near Flat) to keep your little one comfortable. The anti-shock design ensures a smooth ride on a variety of surfaces and the 5-point harness is effective in protecting the baby's safety. The storage basket under the seat is suitable for storage and the rear wheels will brake with one foot. This stroller is ASTM certified for safety and is perfect for any adventure for you and your family.",
},
size: {
  width: {
    length: 17,
    unit: inch,
  },
  height: {
    length: 22,
    unit: inch,
  },
  depth: {
    length: 14,
    unit: inch,
  },
},
weight: {
  net: {
    weight: 7.4,
    unit: pound,
  },
},
features: [
  {
    name: "One Hand Fold",
```

512

FIG. 7 description: "Deliver a true one-hand, easy fold compact travel stroller that can stand on its own when folded.",
view: "full",
human: true, name: "Trolley Bar Lightweight Design",
description: "Super simple one-handed self-supporting folding can be easily closed, allowing parents to realize holding the baby at the same time, one-handed folding stroller, pulling travel.",
view: "partial",
human: true, name: "Multiple Angle Adjustment Design",
description: "Adjust the footrest to achieve the perfect fit and the backrest tilt of the travel stroller can be adjusted from 90° (Sitting) to to 145°(half lying) to 174°(Near Flat).",
view: "partial",
human: false, name: "Anti-Vibration & Braking",
description: "Safe smoothly free from bumps with Anti-shock design and the shock-absorbing stroller ensures a smooth ride on a variety of surfaces.",
view: "partial",
human: false,
audio: yes
location: lower part, near wheels name: "Storage Basket",
description: "The storage basket under the seat are very suitable for storage.",
view: "partial",
human: false,
addons: bottle, towel

FIG. 7 (Cont.)

| Shot | ID | Name | Description | Robot | Item positioning | Camera angle | Platform movement | Camera movement | Props | Human | Action needed | Post production notes | Post production text |
|---|---|---|---|---|---|---|---|---|---|---|---|---|---|
| 1 | 989802-1 | Overall | | Big | Standing | Wide shot | Rotating 360 | Fixed | | No | | Add dimensons | |
| 2 | 989802-2 | One Hand Fold | Deliver a true one-hand, easy fold | Big | Standing | Wide shot | Fixed | Zoom in | | Yes | Fold | | One hand fold |
| 3 | 989802-3 | Lightweight | Super simple lightweight | Big | Folded | Close up | Rotating 20 | Fixed | | No | | Add weight | Lightweight |
| 4 | 989802-4 | Angle adjustment | Adjust the footrest to achieve the perfect fit | Small | Standing | Close up | Rotating 20 | Up/down | | Yes | Change angle | Show angle change | Angle adjustment |
| 5 | 989802-5 | Anti-vibration | Safe smoothly free from bumps with anti-shock design and the shock-absorbing | Small | Standing | Close up | Rotating 20 | Zoom in | | No | | | Anti-vibration structure |
| 6 | 989802-6 | Storage basket | The storage basket under the seat are suitable for everything | Big | Standing | Medium shot | Rotating 360 | Lower angle | Baby bottle, towel | No | | Light around basket | Big storage basket |

FIG. 9

AUTOMATED PRODUCTION PLAN FOR PRODUCT VIDEOS

TECHNICAL FIELD

The following disclosure is directed to systems and methods for creating product videos and, more specifically, generating automated production plans for product videos.

BACKGROUND

Product videos are often used to showcase a particular product, highlighting its features, benefits, and use cases. These videos can be used for marketing purposes to promote and sell the product to potential customers. Product videos can take various forms, including live-action videos, animated videos, 3D renderings, and demonstrations. They can be created by companies, marketers, and/or individuals, and are often shared on social media, websites, and other online platforms to generate buzz and increase sales. The goal of a product video is to provide viewers with a clear understanding of what the product is, how it works, and why they should buy it. However, the creation of such product videos can be a lengthy, manual process that varies based on product type. In many cases, a production plan is manually created that includes all of the shots needed to create the product video.

SUMMARY

At least one aspect of the present disclosure is directed to a method for automatically generating a product video. The method includes receiving a product and a product identifier corresponding to the product, collecting physical product data of the product, receiving digital product data associated with the product identifier from at least one digital source, combining the physical product data and the digital product data into a combined product data structure, generating a production plan for the product video based on the combined product data structure, and automatically operating at least one equipment item to record the product video based on the production plan.

In some embodiments, collecting physical product data of the product includes collecting at least one scan of the product via at least one data collection device. In some embodiments, the at least one data collection device includes a camera. In some embodiments, the at least one scan includes a photo of the product. In some embodiments, the at least one scan includes a photo of packaging associated with the product.

In some embodiments, receiving digital product data associated with the product identifier from the at least one digital source includes receiving digital product from a product database. In some embodiments, receiving digital product data associated with the product identifier from the at least one digital source includes receiving digital product from a product website. In some embodiments, the production plan includes a list of shots for recording the product video.

In some embodiments, the production plan includes a list of equipment items for recording the product video. In some embodiments, the production plan includes instructions for operating the at least one equipment item. In some embodiments, combining the physical product data and the digital product data into a combined product data structure includes providing a plurality of prompts associated with the product to an artificial intelligence (AI) model. In some embodiments, the method includes modifying the plurality of prompts based on the physical and digital product data.

Another aspect of the present disclosure is directed to a system for automatically generating a product video. The system includes a plurality of equipment items, at least one memory for storing computer-executable instructions, and at least one processor for executing the instructions stored on the at least one memory. Execution of the instructions programs the at least one processor to perform operations that include receiving a product and a product identifier corresponding to the product, collecting physical product data of the product, receiving digital product data associated with the product identifier from at least one digital source, combining the physical product data and the digital product data into a combined product data structure, generating a production plan for the product video based on the combined product data structure, and automatically operating at least one equipment item of the plurality of equipment items to record the product video based on the production plan.

In some embodiments, the system includes at least one data collection device, wherein collecting physical product data of the product includes collecting at least one scan of the product via the at least one data collection device. In some embodiments, the at least one data collection device includes a camera. In some embodiments, the at least one scan includes a photo of the product. In some embodiments, the at least one scan includes a photo of packaging associated with the product.

In some embodiments, receiving digital product data associated with the product identifier from the at least one digital source includes receiving digital product from a product database. In some embodiments, receiving digital product data associated with the product identifier from the at least one digital source includes receiving digital product from a product website. In some embodiments, the production plan includes a list of shots for recording the product video.

In some embodiments, the production plan includes a list of equipment items for recording the product video. In some embodiments, the list of equipment items includes at least a portion of the plurality of equipment items. In some embodiments, the production plan includes instructions for operating the at least one equipment item. In some embodiments, combining the physical product data and the digital product data into a combined product data structure includes providing a plurality of prompts associated with the product to an artificial intelligence (AI) model. In some embodiments, execution of the instructions programs the at least one processor to perform operations that include modifying the plurality of prompts based on the physical and digital product data.

Another aspect of the present disclosure is directed to a system for generating an automated production plan for product videos. The system includes at least one data collection device, at least one memory for storing computer-executable instructions, and at least one processor for executing the instructions stored on the at least one memory. Execution of the instructions programs the at least one processor to perform operations that include collecting at least one scan of a product via the at least one data collection device, extracting physical product data from the at least one scan, receiving digital product data associated with the product from at least one digital source, combining the physical product data and the digital product data into a combined product data structure, and generating a production plan for a product video based on the combined product data structure.

In some embodiments, the at least one data collection device includes a camera. In some embodiments, the at least one scan includes a photo of the product. In some embodiments, the at least one scan includes a photo of packaging associated with the product. In some embodiments, the at least one digital resource includes a product database. In some embodiments, the at least one digital resource includes a product website. In some embodiments, the production plan includes a list of shots for filming the product video.

In some embodiments, the production plan includes a list of equipment for filming the product video. In some embodiments, the system includes a plurality of equipment items configured to film the product video. In some embodiments, the production plan includes instructions for operating at least at least one equipment item of the plurality of equipment items to film the product video. In some embodiments, execution of the instructions programs the at least one processor to perform operations that include controlling at least one equipment item of the plurality of equipment items based on the production plan to film the product video. In some embodiments, generating the combined product data structure includes providing a plurality of prompts associated with the product to an artificial intelligence (AI) model. In some embodiments, execution of the instructions programs the at least one processor to perform operations that include modifying the plurality of prompts based on the physical and digital product data.

Another aspect of the present disclosure is directed to a method for generating an automated production plan for product videos. The method includes collecting, via at least one data collection device, at least one scan of a product, extracting, via a production plan engine, physical product data from the at least one scan, receiving, via the production plan engine, digital product data associated with the product from at least one digital source, combining, via the production plan engine, the physical product data and the digital product data into a combined product data structure, and generating, via the production plan engine, a production plan for a product video based on the combined product data structure.

In some embodiments, the at least one data collection device includes a camera. In some embodiments, the at least one scan includes a photo of the product. In some embodiments, the at least one scan includes a photo of packaging associated with the product. In some embodiments, receiving digital product data associated with the product from at least one digital source includes receiving digital product from a product database. In some embodiments, receiving digital product data associated with the product from at least one digital source includes receiving digital product from a product website. In some embodiments, the production plan includes a list of shots for filming the product video.

In some embodiments, the production plan includes a list of equipment for filming the product video. In some embodiments, the production plan includes instructions for operating at least one equipment item of a plurality of equipment items to film the product video. In some embodiments, the method includes controlling at least one equipment item of a plurality of equipment items based on the production plan to film the product video. In some embodiments, generating the combined product data structure includes providing a plurality of prompts associated with the product to an artificial intelligence (AI) model. In some embodiments, the method includes modifying the plurality of prompts based on the physical and digital product data.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

FIG. 4A illustrates an example product detail page (PDP);

FIG. 4B illustrates an example PDP data set;

FIG. 7 illustrates an example product data structure in accordance with aspects described herein;

FIG. 9 illustrates an example of a production plan in accordance with aspects described herein;

DETAILED DESCRIPTION

Figure 1:
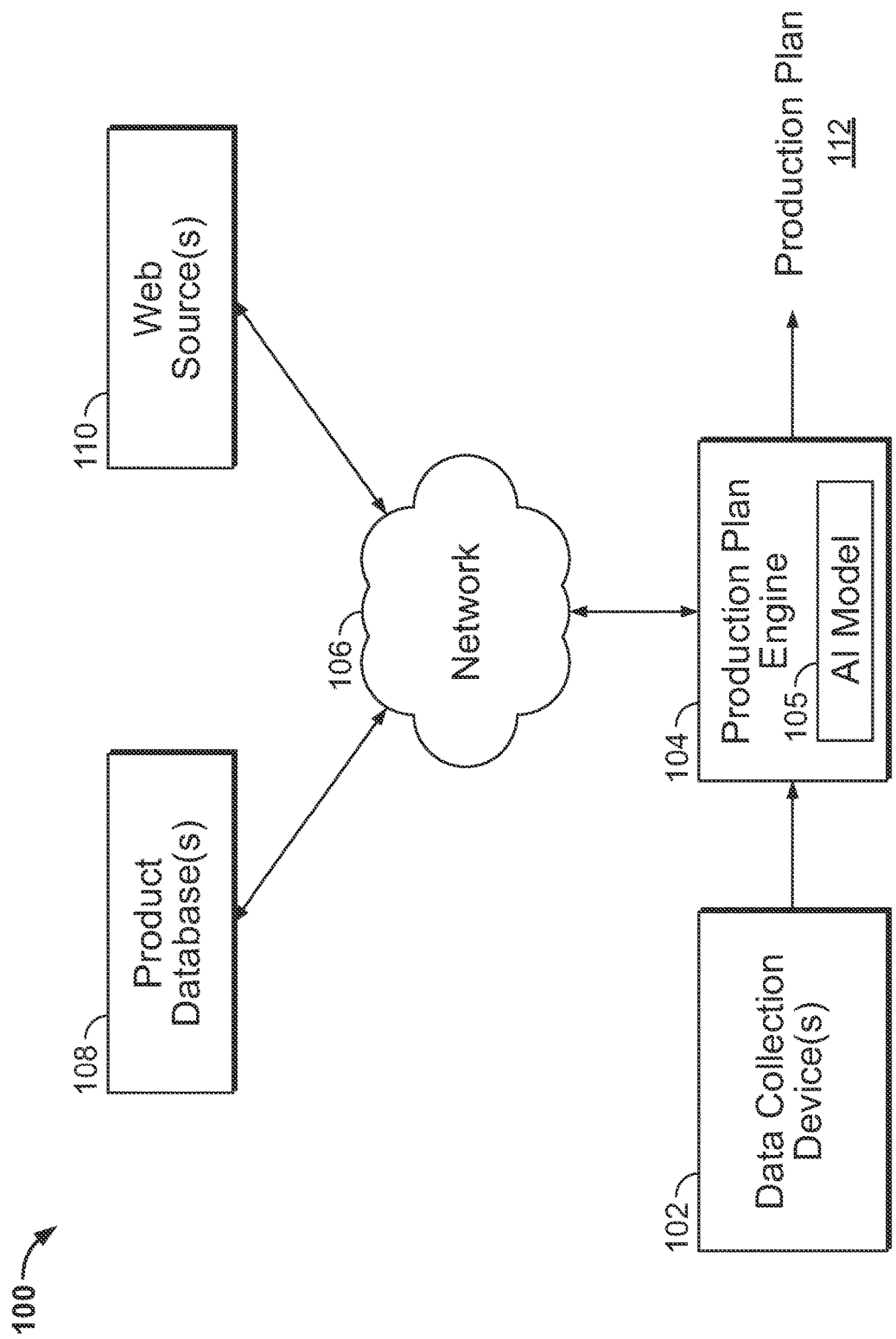
FIG. 1 illustrates a block diagram of a video production system in accordance with aspects described herein.

Disclosed herein are exemplary embodiments of systems and methods for creating product videos. In particular, described are various embodiments of a system for generating automated production plans for product videos.

As discussed above, product videos are often used to showcase a particular product, highlighting its features, benefits, and use cases. These videos can be used for marketing purposes to promote and sell the product to potential customers. Product videos can take various forms, including live-action videos, animated videos, 3D renderings, and demonstrations. They can be created by companies, marketers, and/or individuals, and are often shared on social media, websites, and other online platforms to generate buzz and increase sales. The goal of a product video is to provide viewers with a clear understanding of what the product is, how it works, and why they should buy it.

Product videos can be filmed in a variety of ways, depending on the type of product, the desired outcome, and the budget. In many cases, product videos are filmed using a production plan that describes a list of shots that are desired for the video. Such production plans can include specific types of equipment and/or tools for capturing and editing the shots. In some examples, the filming of a product video includes several stages. For example, a pre-production stage includes developing a script, storyboard, or shot list (e.g., to be included in the production plan). The pre-production stage may also include selecting the right equipment, such as cameras, lighting, and sound equipment. During a set-up stage, the filming location is prepared with props, lighting, and any necessary equipment. The product may be set-up and positioned in a way that is visually appealing. Next, during a filming stage, the product is captured from different angles and distances (e.g., in accordance with the production plan). Depending on the type of product, close-ups of specific features or components may be included. In a post-production stage, the footage is edited to create the final product video. This may include adding music, voiceover, text overlays, and special effects. In some examples, color correction and audio editing may be performed. In a finalization stage, the product video is exported and/or compressed to an appropriate file format and resolution for a desired platform or medium.

The filming of a product video involves careful planning, attention to detail, and technical expertise. As such, the creation of such product videos can be a lengthy, manual process. For example, the production plan that includes all of the shots needed to create the product video is typically created manually (e.g., by directors or producers of the product video). Furthermore, discrepancies may arise between the product seller and the production team when developing production plans for product videos.

Accordingly, improved systems and methods for generating automated production plans for product videos are provided herein. In at least one embodiment, the system includes at least one data collection device that is used to collect a scan of a product. In one example, the system is configured to extract physical product data from the scan. Likewise, the system is configured to receive digital product data from at least one digital source. In some examples, the physical product data and the digital product data are combined into a data structure that is used to generate a production plan for a product video.

FIG. 1 is a block diagram of a video production system 100 in accordance with aspects described herein. In one example, the system 100 includes one or more data collection devices 102 and a production plan engine 104. The data collection devices 102 can include cameras, video recorders, cell phones, microphones, tablet computers, laptop computers, barcode scanners, weight scales, or any other suitable devices for collecting or measuring product data. In some examples, the one or more data collection devices 102 are operated manually by the production team. In other examples, at least a portion of the data collection devices 102 may be operated automatically (e.g., by the production plan engine 104).

The data collection devices 102 are configured to collect one or more product scans. Such scans may include photographs, videos, or barcode scans of the product (or product packaging). In some examples, the collected scans are provided to the production plan engine 104. For example, the data collection devices 102 may communicate with the production plan engine 104 over a wired (e.g., ethernet, USB, etc.) or wireless (e.g., Wi-Fi, Bluetooth, etc.) connection. In one example, the production plan engine 104 is configured to extract physical product data from the product scans received from the data collection devices 102. In some examples, the production plan engine 104 uses one or more image and/or video processing techniques to extract information from the product scans. For example, the production plan engine 104 may use optical character recognition (OCR) techniques, image segmentation techniques, feature extraction techniques, video analysis techniques, speech recognition techniques, computer vision algorithms, video summarization techniques, or any other suitable techniques for extracting physical product data from the product scans. In some examples, the data collection devices 102 are configured to record audio and/or text notes from the production team. For example, members of the production team may speak or type notes regarding the physical characteristics of the product (or the product packaging). The production plan engine 104 may classify these notes as physical product data. In some examples, the notes are saved for reference during post-production of the product video.

In some examples, the production plan engine 104 is configured to receive digital product data from at least one digital source. For example, the production plan engine 104 may receive digital product data over a network 106 (e.g., a wired or wireless internet connection). In one example, the production plan engine 104 receives digital product data from one or more product databases 108. The product database 108 may include data associated with the same product or products similar to (or related to) the product. For example, the product data base 108 may include data previously collected from the same product. The product database 108 may include data previously collected from a different variation of the same product (e.g., a different color, size, etc.). In some examples, the product database 108 includes data associated with products made by the same manufacturer (e.g., the same brand). Likewise, the product database 108 may include data associated with similar products made by different manufacturers (e.g., different brands).

The production plan engine 104 also receives digital product data from one or more web sources 110. In one example, the web sources 110 include a product website. In some examples, the web sources 110 include a merchant website selling the product. The web sources 110 may include other websites related to the product (or the brand). In some examples, the production plan engine 104 analyzes the content of websites by reviewing the backend of the website (e.g., the HTML, text, JSON, etc.). In some examples, the production plan engine 104 analyzes the content of websites by reviewing the frontend of the website (e.g., the content displayed to viewers of the website). In some examples, the production plan engine 104 is configured to use one or more image processing techniques to extract information from website content (e.g., backend or frontend). For example, the production plan engine 104 may use optical character recognition (OCR) techniques, image segmentation techniques, feature extraction techniques, or any other suitable techniques for extracting digital product data from the web sources 110. In some examples, the web sources 110 include multimedia websites (e.g., YouTube, Facebook, Twitter, Instagram, etc.) where the product is being presented, discussed, and/or reviewed. In such examples, the production plan engine 104 is configured to use one or more multimedia processing techniques to extract information from multimedia content. For example, the production plan engine 104 may use OCR techniques, video analysis techniques, speech recognition techniques, computer vision algorithms, video summarization techniques, or any other suitable techniques for extracting digital product data from the web sources 110.

The production plan engine 104 generates a production plan 112 for the product video based on the physical product data and the digital product data. As described in greater detail herein, the production plan engine 104 may utilize an artificial intelligence (AI) model 105 to generate the production plan 112. In some examples, the AI model 105 is a generative pretrained transformer (GPT) model. In some examples, the AI model 105 is specifically trained for the purposes of video production. The production plan 112 includes a list of shots for filming the product video. In some examples, the list of shots corresponds to the specific product itself (e.g., the size, shape, function, etc. of the product). The production plan 112 may include: shot numbers for each shot, shot descriptions (e.g., what part or feature of the product is being shot), a position of the product, camera placement and orientation (e.g., wide shot, medium shot, close-up, etc.), camera motion, lens/zoom/focus settings, platform/stage motion, light and microphone settings, props, talent required for the shot (e.g., a model, hands, a pet, etc.), actions for the shot (e.g., click a button on the product, turn a knob on the product, add water, etc.), technical product instructions (e.g., such as specific ways to use or activate the product), or any combination thereof. In some examples, the production plan 112 includes instructions for a motion control system that controls the camera motion and the stage/platform motion, instructions to other automated parts in the studio (e.g., lights, microphone etc.), and/or important points to consider for the post-production processing of each shot. The production plan 112 may be relied upon by individuals assisting with the product video (e.g., the production team). For example, the individual(s) may review the production plan before each shot in order to capture the shot in a desired (or optimal) manner.

Figure 2:
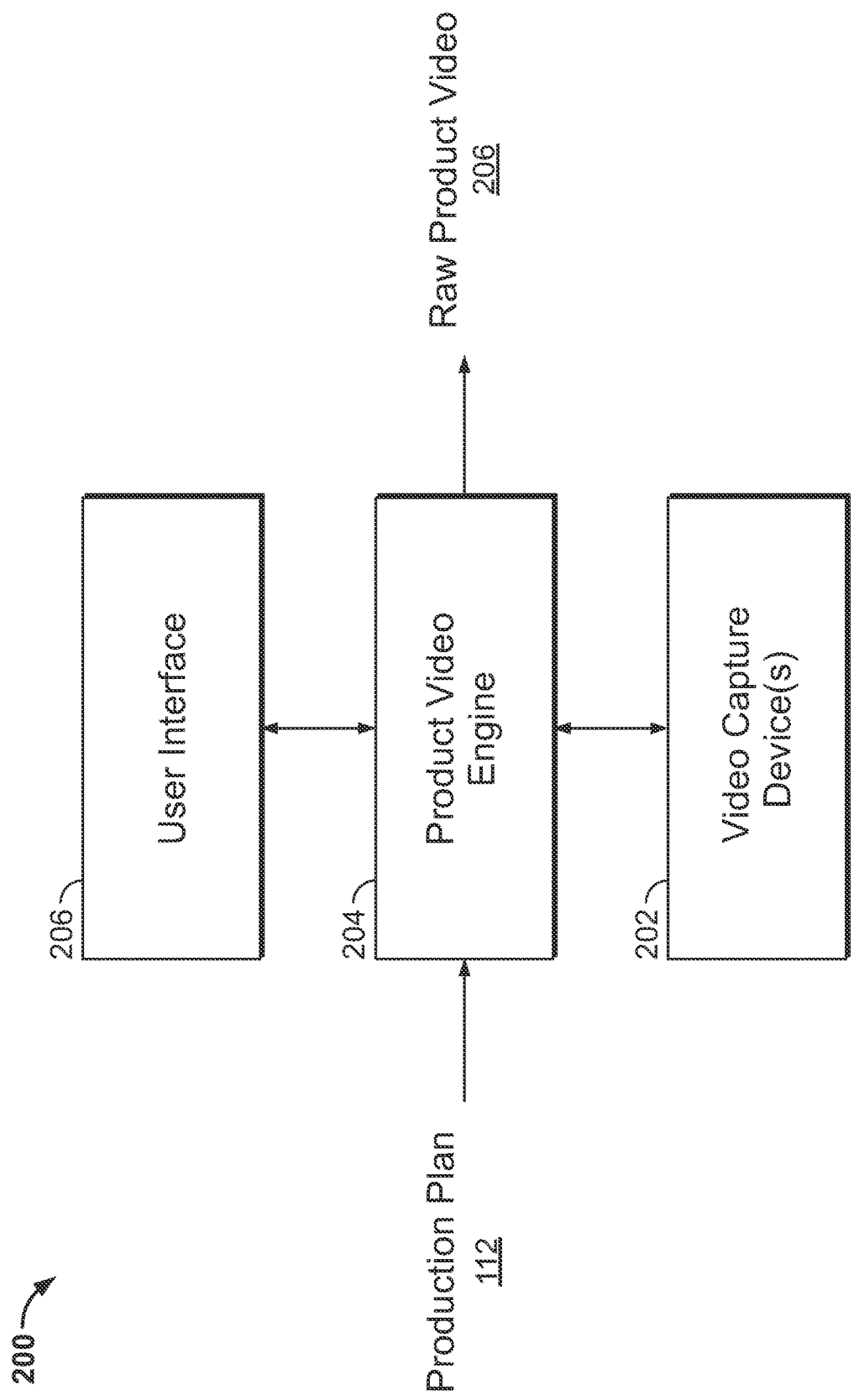
FIG. 2 illustrates a block diagram of a video capture system in accordance with aspects described herein.

In some examples, the production plan 112 is used to automatically control equipment in order to capture each shot. FIG. 2 is a block diagram of a video capture system 200 in accordance with aspects described herein. In one example, the video production system 100 of FIG. 1 and the video capture system 200 of FIG. 2 are included in a combined system; however, in other examples, the systems 100, 200 may be separate systems. As shown in FIG. 2, the system 200 includes one or more video capture devices 202, a product video engine 204, and a user interface (UI) 206. The video capture devices 202 can include video cameras, camera positioning systems, lighting systems, mechanical systems (e.g., moveable or rotating stages/platforms), or any other suitable devices for recording, positioning, or manipulating the product. In some examples, the UI 206 enables the production team to provide information to the product video engine 204 and/or receive instructions from the product video engine 204.

The product video engine 204 is configured to receive a production plan (e.g., production plan 112) and derive controls for the one or more video capture devices 202. In some examples, the product video engine 204 automatically controls (or operate) the one or more video capture devices 202 in order to capture each shot in a desired (or optimal) manner. For example, the product video engine 204 may rotate a platform that the product is positioned on while moving a video camera and operating the camera to record the product. In addition, it should be appreciated that the product video engine 204 may control a portion of the video capture devices 202 while others are operated manually (e.g., by the production team). For example, the product video engine 204 may operate a rotating platform that the product is positioned on while the production team manually records the shot. In some examples, the product video engine 204 is configured to edit the raw footage to produce a product video 206. In such cases, the product video engine 204 may edit the raw footage based on the production plan 112. Alternatively, the product video engine 204 may output the raw footage as the product video 206. In such cases, the product video 206 is manually edited to produce the final presentation.

Figure 3:
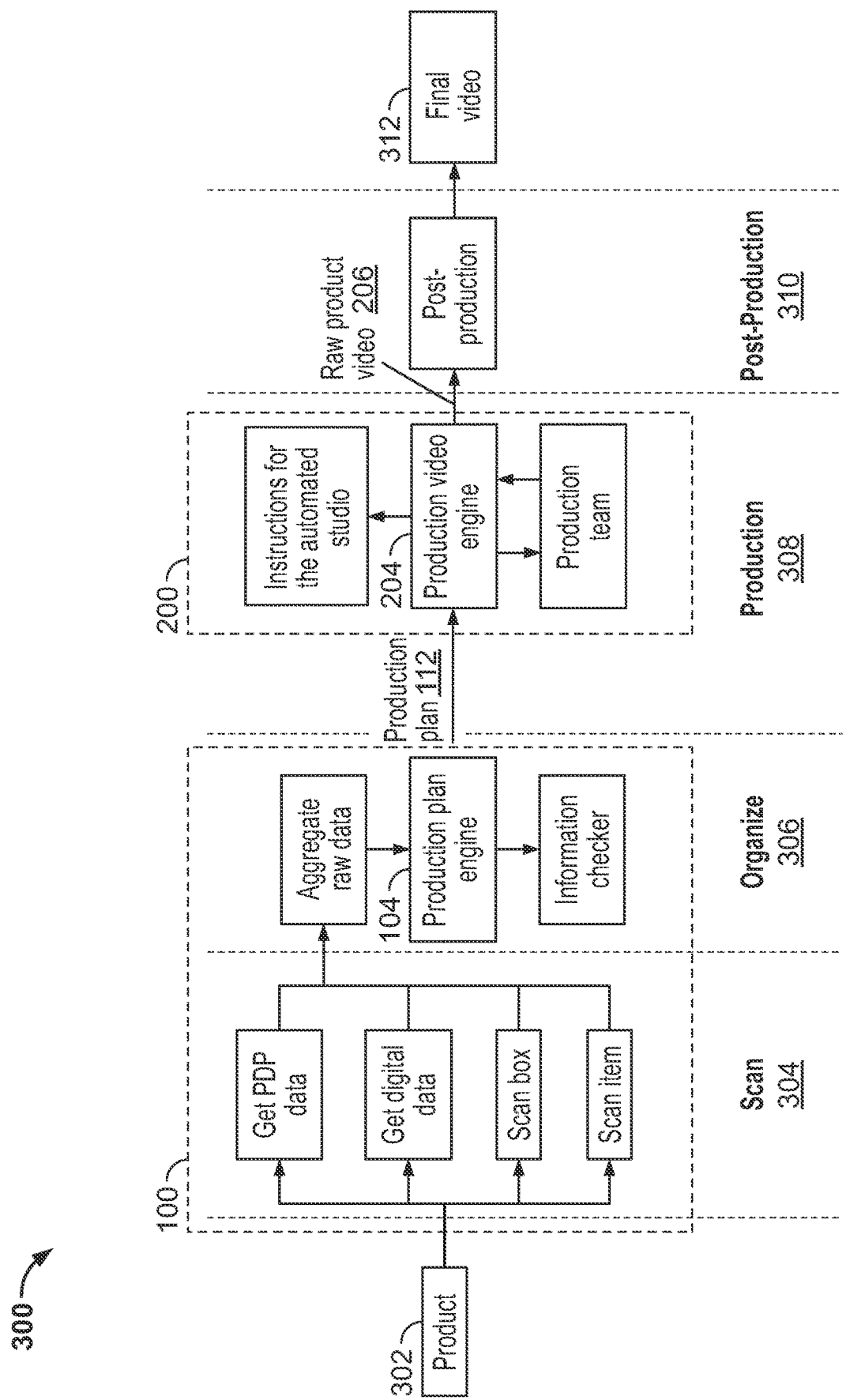
FIG. 3 illustrates a flow diagram of a method for generating a product video in accordance with aspects described herein.

FIG. 3 is a flow diagram of a method 300 for generating a product video in accordance with aspects described herein. In one example, the method 300 is configured to be carried out by the video production system 100 of FIG. 1 and the video capture system 200 of FIG. 2.

At step 302, a new product is provided for a product video. In one example, a name or description of the product is provided to the video production system 100. In some examples, a product ID is provided to the video production system 100. For example, the product ID may be entered by a member of the production team. The product ID may include a Universal Product Code (UPC) number, a stock keeping unit (SKU) number, a manufacturer ID number, or any other suitable identifying number/classifier. In some examples, the product ID is derived by the video production system 100 (e.g., using the data collection devices 102).

Figure 4A:
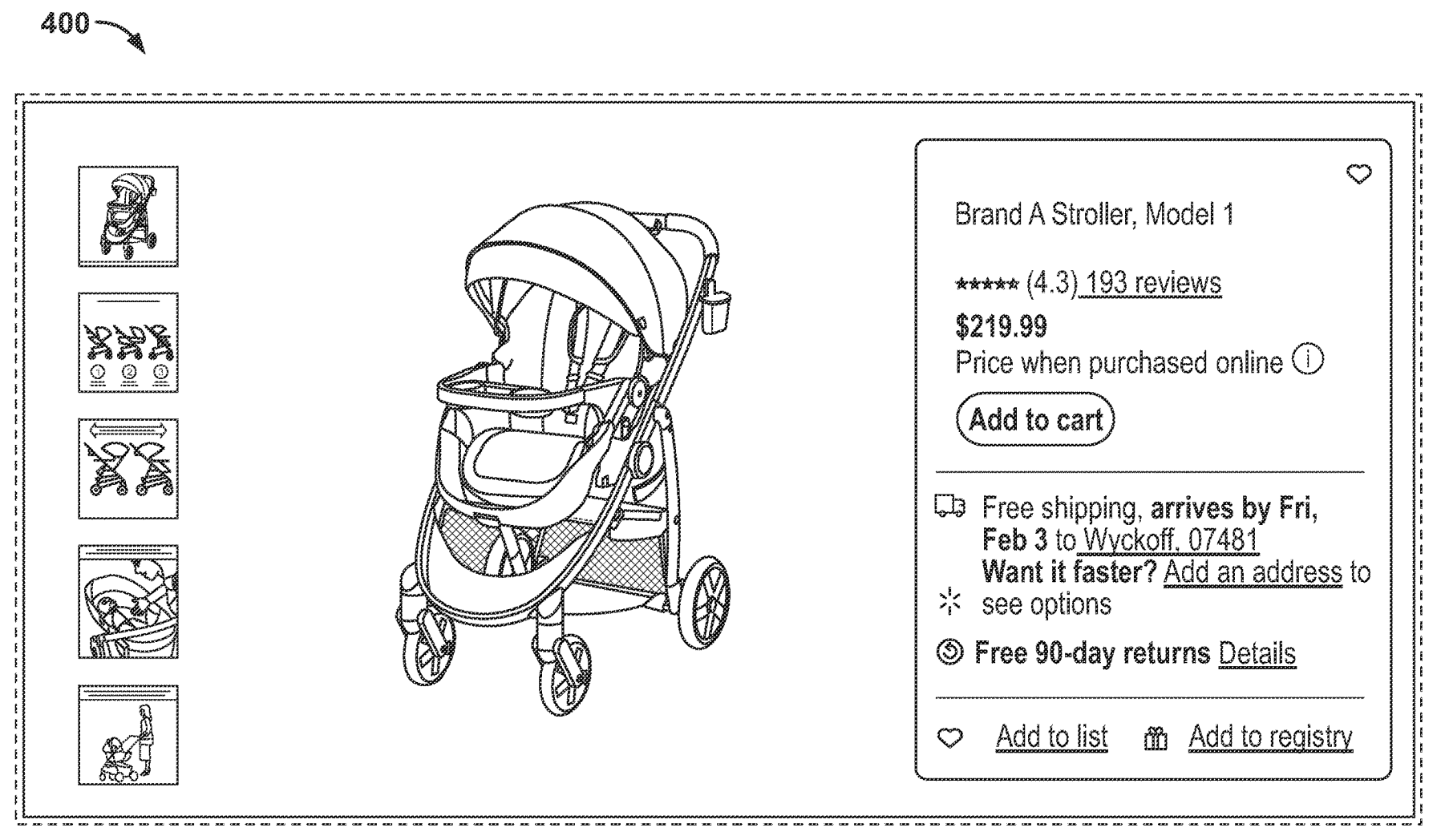

At step 304, the physical and digital product data is collected. As described above, the video production system 100 may be used to collect both physical and digital scans of the product. In some examples, the video production system 100 is configured to scan the web sources 110 to collect digital product data. For example, the video production system 100 may receive (or retrieve) digital product data from retailer and manufacturer websites. In some examples, the video production system 100 receives (or retrieves) digital product data from a product detail page (PDP) associated with the product. A PDP is a web page or a section of a website that provides detailed information about a specific product. PDPs are used in e-commerce websites to display information about a product, including its features, specifications, images, price, reviews, and other relevant details. FIG. 4A illustrates an example PDP 400 for a stroller product. FIG. 4B illustrates an example PDP data set 450 associated with a PDP. In some examples, the video production system 100 is configure to use an application programing interface (API) to extract the PDP data set from the PDP (i.e., the website). For example, the video production system 100 may provide a query to the API (e.g., including the product ID or a product link) and the API may return the PDP data set associated with the query. The PDP data set may be in JSON, text, a data structure format, a list of files, or any other suitable format. In some examples, the PDP is part of a website operated by a merchant associated with the product video. In some examples, the PDP is part of a website operated by the manufacturer of the product. In some examples, the video production system 100 is configured to access multiple PDPs associated with the product (e.g., from different merchants). In addition, the video production system 100 may receive (or retrieve) digital product data from multimedia web sources (e.g., YouTube, Facebook, etc.). In some examples, the video production system 100 is configured to receive (or retrieve) digital product data from the product database 108. As described above, the product database 108 includes historical data relating to the product or related products. Digital and physical product data collected from prior scans may be stored in the product database 108.

In some examples, the video production system 100 scans the product 302 to collect physical product data. As described above, the data collection devices 102 may be used to collect one or more product scans. Such scans can include photographs, videos, or barcode scans of the product (or product packaging). In some examples, the data collection devices 102 are manually operated by users (e.g., production team members) to collect the product scan(s). In some examples, at least one data collection device is operated automatically by the video production system 100 to collect the product scan(s).

Figure 5:
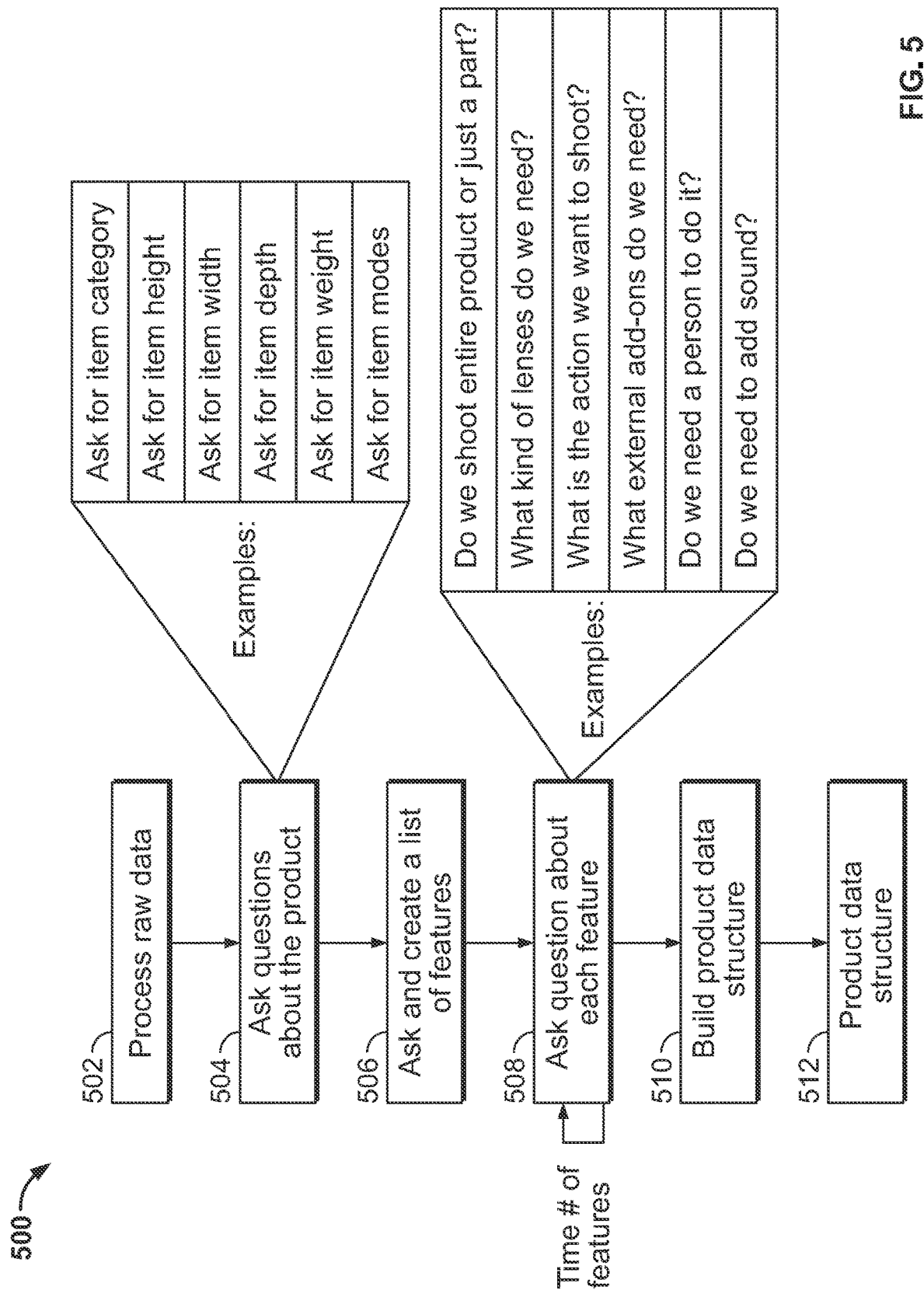
FIG. 5 illustrates a process for organizing and structuring physical and digital product data in accordance with aspects described herein.

At step 306, the raw data collected in step 304 is organized and structured by the production plan engine 104. FIG. 5 illustrates a process 500 for organizing and structuring the physical and digital product data using the AI model 105. In one example, the process is configured to be carried out by the production plan engine 104.

At block 502, the aggregated raw data (e.g., the data collected in step 304 of method 300) is processed to extract the desired physical and digital product data. For example, the raw data from the web sources 110 (e.g., the PDP data set 450) may be filtered or parsed to remove any unnecessary data. The PDP data set may be filtered to extract data corresponding to physical details of the product, descriptions of the product, and/or marketing materials associated with the product. Likewise, the production plan engine 104 may process content from multimedia web sources to extract desired digital product data. In some examples, the production plan engine 104 is configured to process the content directly; however, in other examples, the production plan engine 104 may process a representation of the content (e.g., a transcript).

Figure 6:
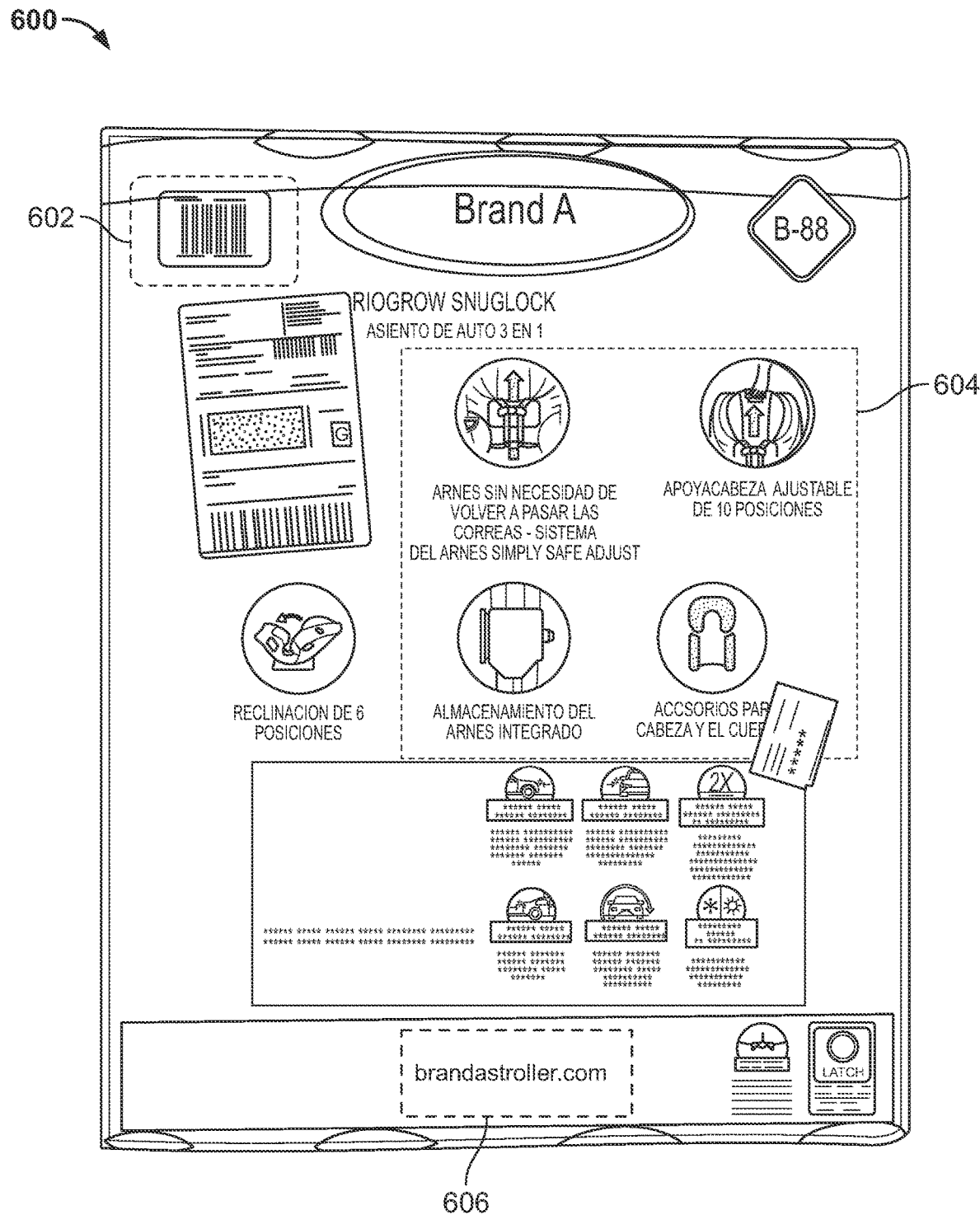
FIG. 6 illustrates an example scan of product packaging in accordance with aspects described herein.

Similarly, the production plan engine 104 may process the scans of the product (and the product packaging) to extract desired physical product data. FIG. 6 illustrates an example scan 600 of product packaging. As shown, the production plan engine 104 processes the scan 600 to extract physical product data including a barcode 602 (e.g., a product ID), a plurality of product features 604, and a product website 606. In some examples, the extracted physical product data (e.g., the barcode 602 and the product website 606) is used to validate the digital product data or to retrieve additional digital product data. The production plan engine 104 may use image and/or video processing techniques to extract text on the product (or the packaging), pictures on the packaging, estimate the size of the product (or the packaging), estimate the weight of the product (or the packaging), determine the colors of the product (or the packaging), determine the location of important parts, and determine the location of product features.

At block 504, the production plan engine 104 feeds questions about the product to the AI model 105. For example, the production plan engine 104 may ask the AI model 105 for the category of the item, the height of the item, the width of the item, the depth of the item, the weight of the item, and the modes of the item. The production plan engine 104 is configured to construct these questions (or prompts) by analyzing the digital and physical product data. For example, a question prompt may be "In the following product description: <insert product description>, what is the item category?" As such, the production plan engine 104 inserts a description of the product included in the digital or physical product data into the question prompt. The production plan engine 104 feeds the completed question to the AI model 105, which returns an answer to the question (e.g., the category of the product). In some examples, the question prompt may include additional information to guide the AI model 105. For example, an example question prompt may be "In the following product description: <insert product description>, what is the item category from the following categories: food, entertainment, home, kids?" The production plan engine 104 may insert a description of the product included in the digital or physical product data into the question prompt. The production plan engine 104 feeds the completed question to the AI model 105, which returns an answer to the question (e.g., one of food, entertainment, home, or kids). In some examples, in the event the AI model 105 is unable to answer one of the questions, the production plan engine 104 may further process the raw data to derive additional physical and digital product data that is relevant to the question.

At block 506, the production plan engine 104 asks the AI model 105 for features of the product based on the product data and the answers received in block 504. In this context, a feature is a unique product representation. Each feature is a part of the product that has its own metadata and can be represented by audio/video assets (e.g., within the product video). A feature can be an item, an element, an accessory, an action, or any important information about the product that can be presented. For example, example features of a stroller may be the brakes, the ability to fold the stroller with one hand, the ability to use the stroller as a car seat, anti-vibration technology, the lightweight nature of the stroller, a storage basket, etc. Likewise, example features of a coffee machine may be the water container, the milk steamer, espresso capabilities, a cappuccino mode, self-cleaning features, the type of pods or capsules used, etc. Similarly, example features of a box of cookies may be the appearance of the box when closed, the appearance of the box when opened, the type or flavor of the cookies, the appearance or texture of a cookie when breaking, a list of the ingredients, etc.

In some examples, the production plan engine 104 is configured to construct these questions (or prompts) by analyzing the digital and physical product data and/or based on the information collected in block 504. For example, the production plan engine 104 may ask "In the following product description: <insert product description>, what are the features?" or "Does the following product: <insert product description>, include this feature: <insert feature name>?". In some examples, the AI model 105 answers these questions using the knowledge repository from which it is trained. In some examples, the AI model 105 is configured to answer these questions by analyzing the digital and physical product data. In some examples, the production plan engine 104 maintains a list of the features associated with the product.

At block 508, the production plan engine 104 asks the AI model 105 questions about each feature of the product. For example, for each feature, the production plan engine 104 may ask if the entire product or just a part of the product should be shot to capture the feature, what kind of lens is needed for the shot, is an action (or interaction) needed for the shot, what are the external add-ons of the product needed for the shot, is a person needed for the shot (e.g., to interact with the product), and is sound needed for the shot. The production plan engine 104 is configured to construct these questions (or prompts) by analyzing the digital and physical product data. For example, one question prompt may be "What items are needed for a video shoot of the different features of a baby car seat with <insert product description>?" As such, the production plan engine 104 inserts a description of the product included in the digital or physical product data into the question prompt. The production plan engine 104 feeds the completed question to the AI model 105, which returns an answer to the question (e.g., the items needed). Another question prompt may be "Which lens should we use when shooting the wheels of the item with the following description <insert product description>?" Again, the production plan engine 104 inserts a description of the product included in the digital or physical product data into the question prompt. The production plan engine 104 feeds the completed question to the AI model 105, which returns an answer to the question (e.g., the lens to use).

In some examples, the production plan engine 104 uses the answers received from the AI model 105, or the feature list, to construct the question. For example, one question prompt may be "Which lens should we use when shooting the <insert feature> of the item with the following description <insert feature/product description>?" As such, the production plan engine 104 inserts a feature from the feature list and a description of the product (or the feature) included in the digital or physical product data into the question prompt. The production plan engine 104 feeds the completed question to the AI model 105, which returns an answer to the question (e.g., the lens to use). Additional question prompts may include "What interaction does <insert feature> require?", "Does this <insert feature> rely on a human interaction to showcase it?", "What props are needed to film this <insert feature or product description>?", "Do we need to record audio for this <insert feature or product description>?", "Does this <insert feature or product description> make a sound?", and "Do we need special lighting to film this <insert feature or product description>?". In some examples, the AI model 105 answers these questions using the knowledge repository from which it is trained. In some examples, the AI model 105 is configured to answer these questions by analyzing the digital and physical product data.

At block 510, the production plan engine 104 compiles the answers received from the AI model 105 to build a product data structure 512. In some examples, the product data structure 512 includes the physical and product data of the product. In some examples, the product data structure 512 corresponds to a database entry for the product. In one example, the product data structure 512 is a combined data structure including the physical product data, the digital product data, and the answers from the AI model 105. In some examples, the product data structure 512 is an object of a programming language or data format. For example, the product data structure 512 may be a JSON object. In some examples, the product data structure 512 includes the product category, name, detailed product description, dimensions (e.g., height, width, length), weight, variants (e.g., color, texture, etc.), physical outputs/indications components (e.g. lights, screens/displays), physical interactive components (e.g. buttons, sliders etc.), parts, claims (e.g., product is approved by . . . , product is good for . . . , etc.), features, connectors, uses, different modes, certifications (e.g., safety, FCC, FDA, etc.), action(s) needed, instructions to the automated parts in the studio, information for the post-production, or any combination thereof. FIG. 7 illustrates an example product data structure 512. It should be appreciated that the product data structure 512 may be built all at once or iteratively as information is received from the AI model 105. For example, each time an answer is received from the AI model 105, the answer may be parsed into a desired format (e.g., JSON), converted to an object, and added to the product data structure 512.

Figure 8:
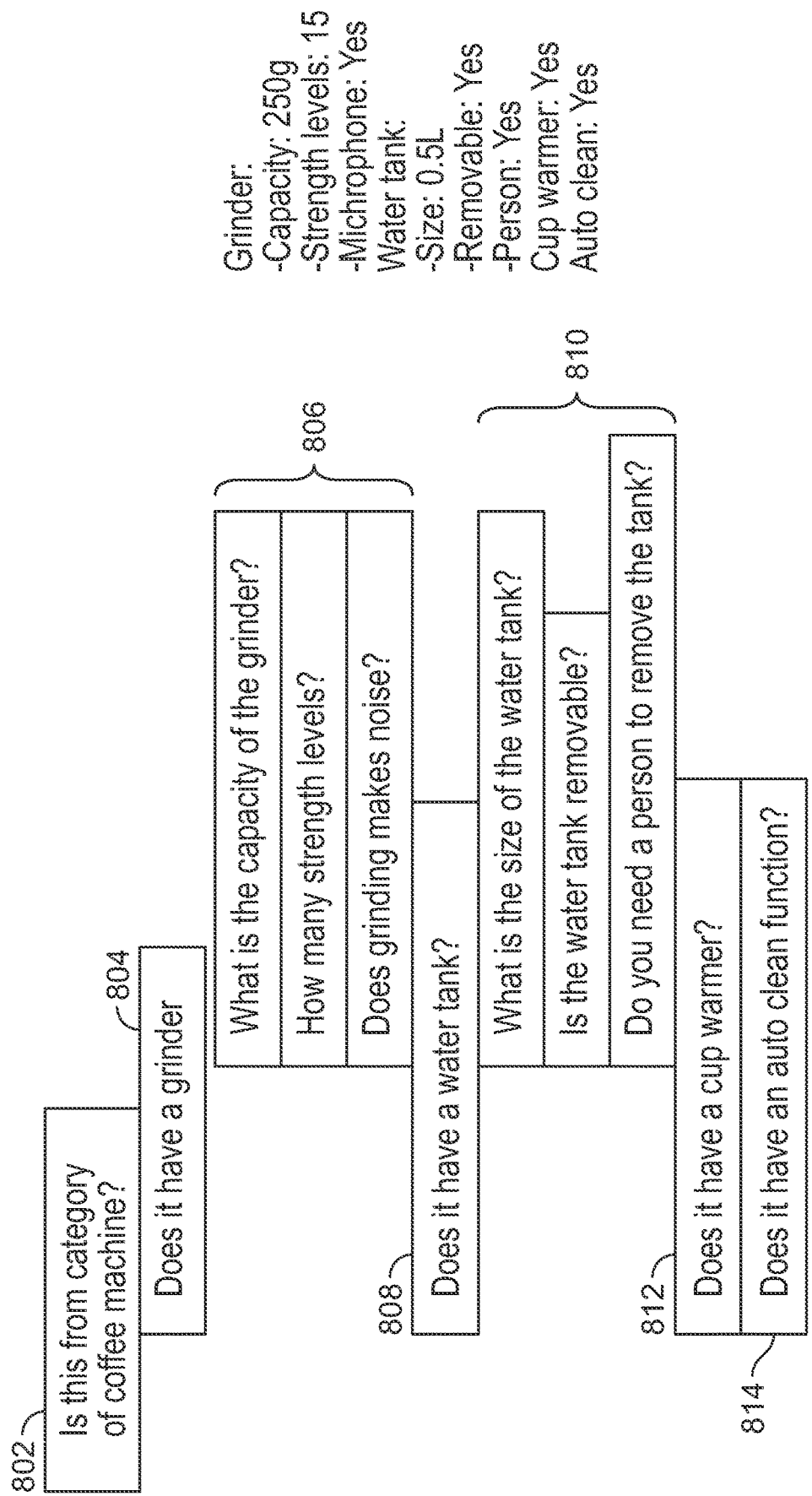
FIG. 8 illustrates a process for organizing and structuring physical and digital product data in accordance with aspects described herein.

In some examples, the production plan engine 104 is configured to follow a script when feeding questions to the AI model 105 (e.g., in blocks 504-508). Alternatively, the order and/or types of questions fed to the AI model 105 may be dynamically adjusted based on the answers received from the AI model 105. For example, as shown in FIG. 8, the production plan engine 104 may feed a first question 802 to the AI model 105. Based on the answer (e.g., yes), the production plan engine 104 selects and feeds a first derivative question 804 to the AI model 105. Likewise, based on the answer (e.g., yes), the production plan engine 104 selects and feeds a plurality of sub-derivative questions 806 to the AI model 105. Next, the production plan engine 104 selects and feeds a second derivative question 808 to the AI model 810. Based on the answer (e.g., yes), the production plan engine 104 selects and feeds a plurality of sub-derivative questions 810 to the AI model 105. The production engine 104 then selects and feeds a third derivative question 812 to the AI model 105. Based on the answer (e.g., no), the production engine 104 moves on the a fourth derivative question 814, and so on. As such, the production plan engine 104 may utilize the previous answers provided from the AI model 105 to determine the types and/or sequence of subsequent questions to ask.

Returning to step 306 of the method of FIG. 3, the video production system 100 may perform an information check on the product data structure (e.g., product data structure 512). For example, since information is collected from several sources, the information check can be used to verify the accuracy of the product data structure 512. In some examples, the information check identifies differences between the physical product data and the digital product data. In some examples, the information check verifies the data aligns with expectations for the product (e.g., the width is more than a minimum width, the weight is less than a maximum weight, etc.). In some examples, the information check determines whether any expected information is missing from the product structure 512 (e.g., the weight of the product, the color of the product, etc.).

The production plan engine 104 is configured to use the product data structure 512 to generate the production plan 112. For example, the production plan engine 104 may apply a predetermined set of rules to generate the production plan 112. In some examples, the rules may correspond to the capabilities and resources of the production studio. Such rules may include: "If the product size is greater than X, use the large robot," "capture one close up shot for each product feature," "capture one full body shot of the product." "if the feature involves an action, use a full body shot to capture the action," and so on.

The production plan 112 includes all of the information needed for the production team to create each shot for the product video. In one example, the production plan 112 includes at least one shot of the product and at least one shot for each feature of the product. FIG. 9 illustrates an example of the production plan 112. As shown, the production plan 112 may include a plurality of different shots (e.g., 3, 6, 12, etc.). In some examples, each shot has an ID, a name, a description, an equipment selection (e.g., robot), a corresponding product position, a camera angle, a platform movement, a camera movement, a prop list, or any combination thereof. In some examples, the production plan 112 includes additional information such as whether a human is needed in the shot or whether an action is needed in the shot. Likewise, the production plan 112 may include post-production notes and other text. In some examples, the production plan 112 includes a list of equipment, props, and individuals needed to carry out the production plan 112 (i.e., to shoot the product video). The production plan engine 104 may consider factors specific to the production team and/or the product retailer when generating the production plan 112. For example, the production team may provide parameters to the production plan engine 104 that include: a minimum length of the product video, a maximum length of the product video, a budget for the product video, a list of available video equipment, a target platform for the product video, and a target audience for the product video. In some examples, the production plan engine 104 applies a weighting criteria based on the provided parameters when generating the production plan 112.

As described above, the production plan 112 may be relied upon by individuals assisting with the product video (e.g., the production team). Such individuals may review the production plan 112 before each shot in order to capture the shot in a desired (or optimal) manner. For example, the production team may review the production plan 112 to determine instructions for operating the equipment used to record the product video. Alternatively, the production plan 112 may be used to automatically control equipment in order to capture each shot of the product video (e.g., via the video capture system 200 of FIG. 2).

At step 308, the production plan 112 is provided to the product video engine 204 of the video capture system 200. In some examples, the product video engine 204 derives controls for the one or more video capture devices 202 based on the production plan 112. In some examples, the product video engine 204 is configured to automatically control (or operate) the one or more video capture devices 202 in order to correctly capture each shot in accordance with the production plan 112.

Figure 10:
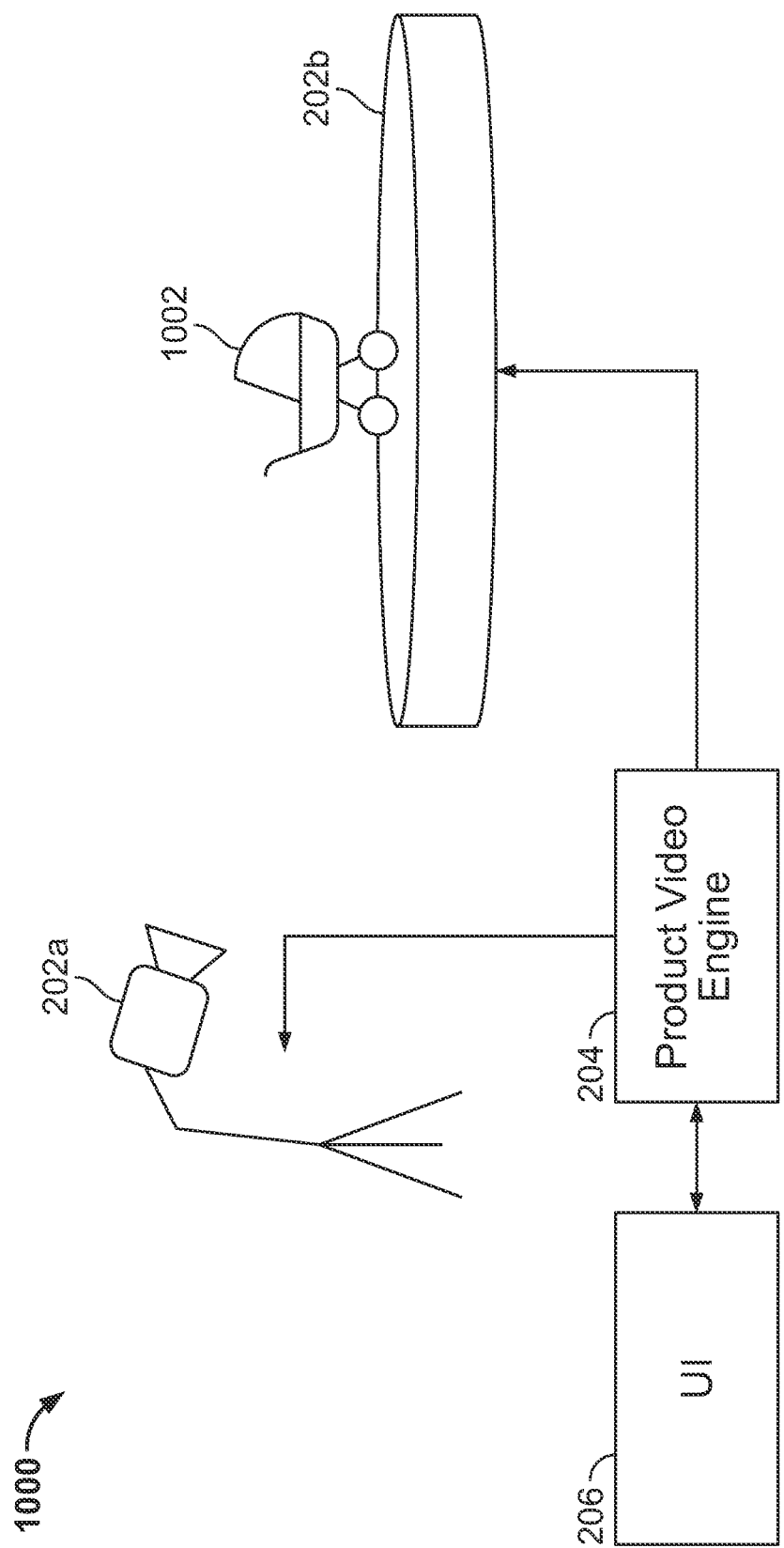
FIG. 10 illustrates an example production studio in accordance with aspects described herein.

FIG. 10 illustrates an example production studio 1000 that includes a camera 202a and a platform 202b. In some examples, the camera 202a and the platform 202b are included in the video capture devices 202. The production video engine 204 may operate the camera 202a and/or the platform 202b to record each shot in the production plan 112. For example, the production video engine 204 may control the camera 202a to record the shot (e.g., start and stop filming), to operate in specific settings, etc. In some examples, the camera 202a is configured to move via a moveable mechanical system (e.g., one or more robotic systems). In such cases, the production video engine 204 may position the camera 202a prior to the shot and/or move the camera 202a during the shot. Likewise, the production video engine 204 may control the platform 202b for recording each shot. For example, the platform 202b may rotate and/or elevate to position the product 1002 relative to the camera 202a. As such, the production video engine 204 may control or operate the platform 202b prior to or during the shot. In some examples, the production studio 1000 includes one or more data collection devices (e.g., microphones) that may record notes from the production team. For example, a member of the team may say the name of a product feature that is being shot or say "start" or "stop". Such notes may be saved and referenced during post-production. Alternatively, the notes may be recorded in a text format (e.g., via the UI 206).

In some examples, the production video engine 204 provides instructions to the production team via the UI 206. For example, the production video engine 204 may instruct the production team to perform various tasks prior to recording each shot (e.g., change the camera lens, adjust the position the product 1002 on the platform 202b, play music, add props, etc.). Likewise, the production video engine 204 may provide instructions during the shot (e.g., triggering a human interaction with the product 1002). In some examples, the UI 206 allows the production team to preview the recorded shot. The UI 206 may allow the production team to provide instructions to the production video engine 204 (e.g., start recording, stop recording, re-record, etc.). In some examples, the UI 206 allows the production team to update the production plan 112. In some examples, the production video engine 204 is configured to automatically tag each shot with information from the production plan 112 (e.g., ID, name, etc.).

At step 310, the raw product video 206 is output from the product video engine 204 for post-production. In some examples, the raw product video 206 corresponds to the raw footage collected for each shot. In some examples, the product video engine 204 is configured to provide a finalized product video 312. In such cases, the product video engine 204 may format the raw footage based on the production plan 112 (e.g., file type, compression, resolution, etc.). Alternatively, the raw product video 206 is manually edited to produce the finalized product video 312. The editors of the raw product video 206 may review the production plan 112 for instructions regarding optimal or desired post-production for each shot.

It should be appreciated that it is not necessary for the video production system 100 of FIG. 1 to perform product scans (e.g., physical or digital) to generate automated production plans. For example, the raw product data may be provided to the system 100 via an external or third-party source. In such cases, the system 100 may process the received raw data to generate the production plan as described above (e.g. starting from step 306 of method 300 of FIG. 3). Likewise, the video capture system 200 of FIG. 2 may utilize the generated production plan to record the product video.

Figure 11:
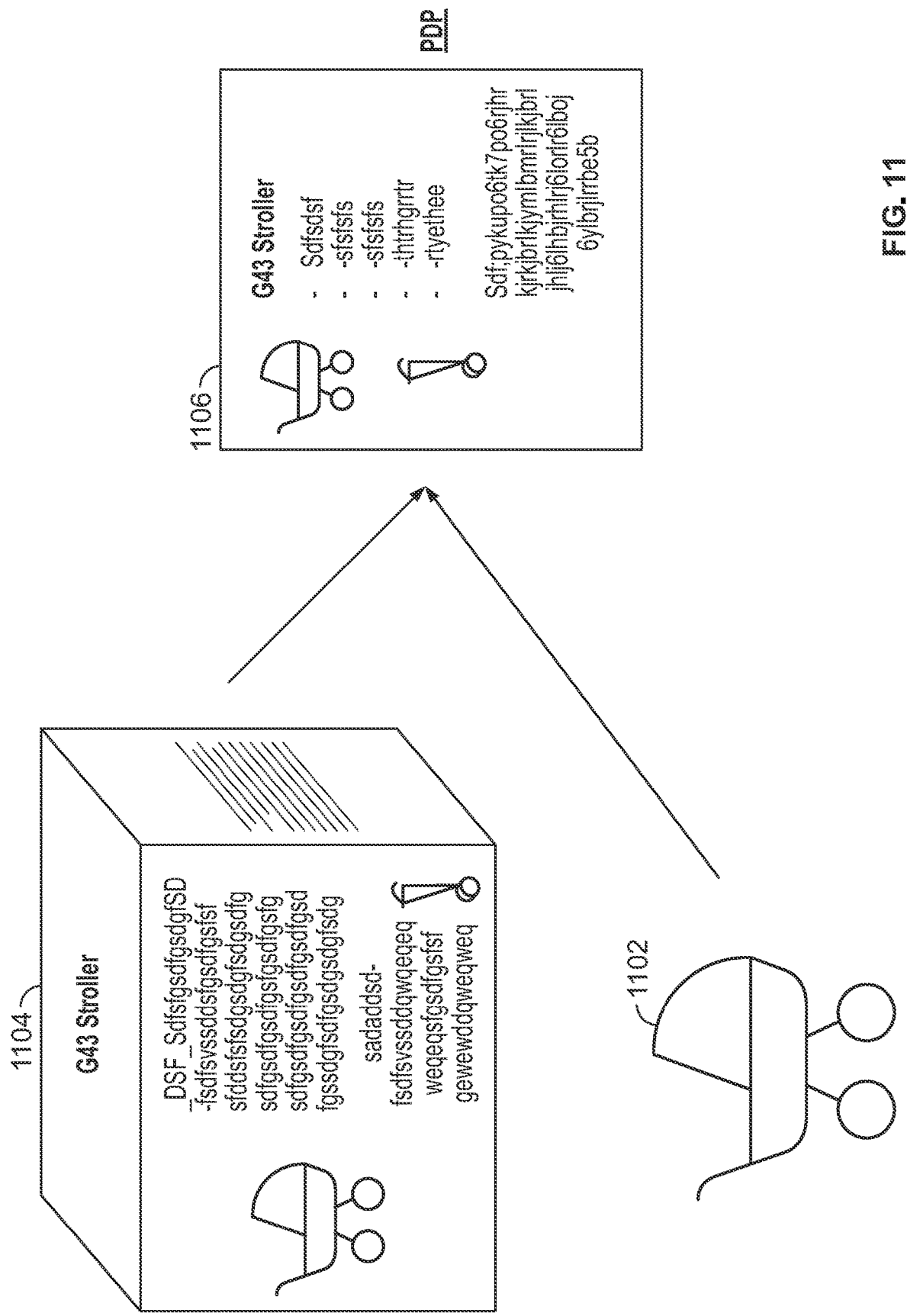
FIG. 11 illustrates a diagram of generating a PDP in accordance with aspects described herein.

While the above embodiments describe generating automated production plans for product videos, it should be appreciated that that the techniques provided herein may be applied to different applications. For example, the video production system 100 of FIG. 1 may be used to generate an automated PDP for a product. As shown in FIG. 11, the physical scans taken of a product 1102 and the product packaging 1104 (e.g., via the one or more data collection devices 102) may be used to generate a PDP 1106 for the product 1102. In some examples, the production plan engine 104 and the AI model 105 are used to extract physical product data from the physical scans and develop a product data structure (e.g., product data structure 512). The resulting product data structure and the scans (e.g., photos of the product/packaging) can be used to generate the PDP 1106.

Hardware and Software Implementations

Figure 12:
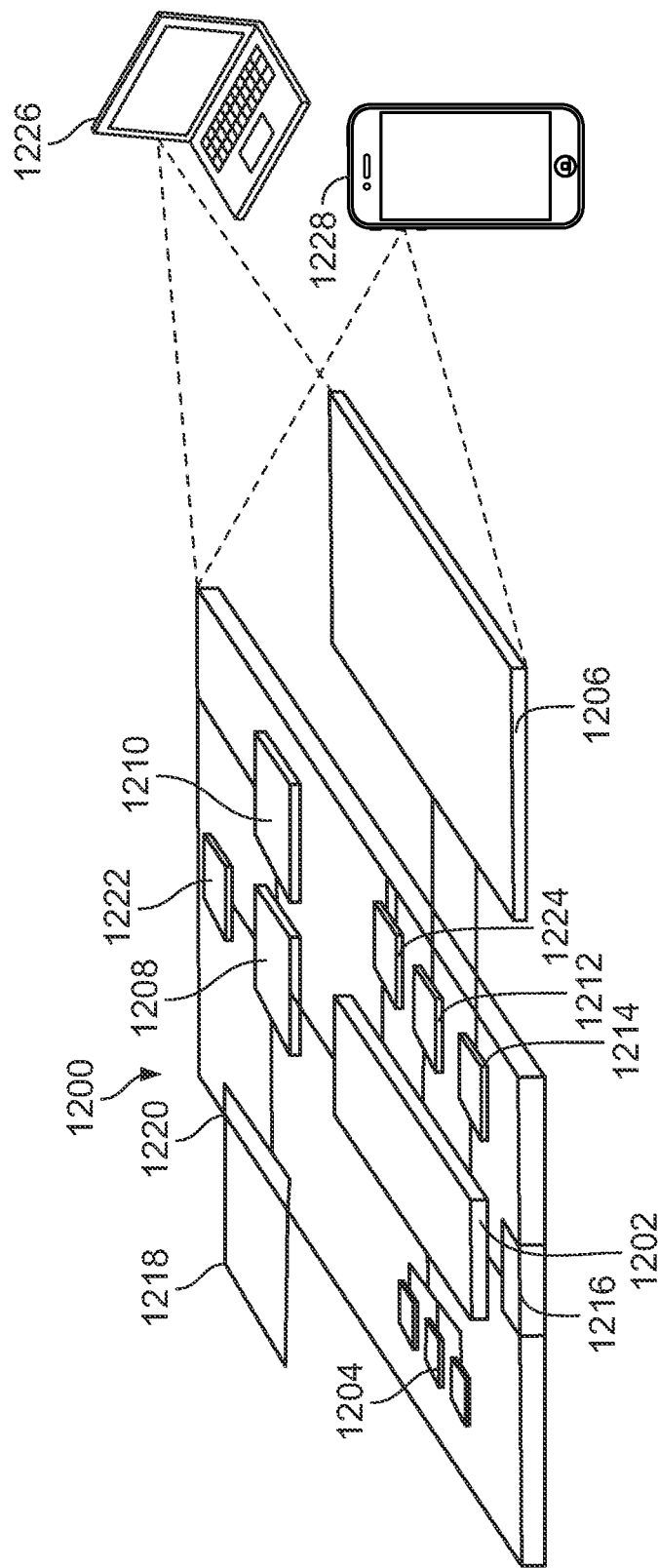
FIG. 12 illustrates an example computing device.

FIG. 12 shows an example of a generic computing device 1200, which may be used with some of the techniques described in this disclosure (e.g., to implement the production plan engine 104 or the product video engine 204). Computing device 1200 includes a processor 1202, memory 1204, an input/output device such as a display 1206, a communication interface 1208, and a transceiver 1210, among other components. The device 1200 may also be provided with a storage device, such as a micro-drive or other device, to provide additional storage. Each of the components 1200, 1202, 1204, 1206, 1208, and 1210, are interconnected using various buses, and several of the components may be mounted on a common motherboard or in other manners as appropriate.

The processor 1202 can execute instructions within the computing device 1200, including instructions stored in the memory 1204. The processor 1202 may be implemented as a chipset of chips that include separate and multiple analog and digital processors. The processor 1202 may provide, for example, for coordination of the other components of the device 1200, such as control of user interfaces, applications run by device 1200, and wireless communication by device 1200.

Processor 1202 may communicate with a user through control interface 1212 and display interface 1214 coupled to a display 1206. The display 1206 may be, for example, a TFT LCD (Thin-Film-Transistor Liquid Crystal Display) or an OLED (Organic Light Emitting Diode) display, or other appropriate display technology. The display interface 1214 may comprise appropriate circuitry for driving the display 1206 to present graphical and other information to a user. The control interface 1212 may receive commands from a user and convert them for submission to the processor 1202. In addition, an external interface 1216 may be provided in communication with processor 1202, so as to enable near area communication of device 1200 with other devices. External interface 1216 may provide, for example, for wired communication in some implementations, or for wireless communication in other implementations, and multiple interfaces may also be used.

The memory 1204 stores information within the computing device 1200. The memory 1204 can be implemented as one or more of a computer-readable medium or media, a volatile memory unit or units, or a non-volatile memory unit or units. Expansion memory 1218 may also be provided and connected to device 1200 through expansion interface 1220, which may include, for example, a SIMM (Single In Line Memory Module) card interface. Such expansion memory 1218 may provide extra storage space for device 1200, or may also store applications or other information for device 1200. Specifically, expansion memory 1218 may include instructions to carry out or supplement the processes described above, and may include secure information also. Thus, for example, expansion memory 1218 may be provided as a security module for device 1200, and may be programmed with instructions that permit secure use of device 1300. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1204, expansion memory 1218, memory on processor 1202, or a propagated signal that may be received, for example, over transceiver 1210 or external interface 1216.

Device 1200 may communicate wirelessly through communication interface 1208, which may include digital signal processing circuitry where necessary. Communication interface 1208 may in some cases be a cellular modem. Communication interface 1208 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1210. In addition, short-range communication may occur, such as using a Bluetooth, WiFi, or other such transceiver (not shown). In addition, GPS (Global Positioning System) receiver module 1222 may provide additional navigation- and location-related wireless data to device 1200, which may be used as appropriate by applications running on device 1200.

Device 1200 may also communicate audibly using audio codec 1224, which may receive spoken information from a user and convert it to usable digital information. Audio codec 1224 may likewise generate audible sound for a user, such as through a speaker, e.g., in a handset of device 1200. Such sound may include sound from voice telephone calls, may include recorded sound (e.g., voice messages, music files, etc.) and may also include sound generated by applications operating on device 1200. In some examples, the device 1200 includes a microphone to collect audio (e.g., speech) from a user. Likewise, the device 1200 may include an input to receive a connection from an external microphone.

The computing device 1200 may be implemented in a number of different forms, as shown in FIG. 12. For example, it may be implemented as a computer (e.g., laptop) 1226. It may also be implemented as part of a smartphone 1228, smart watch, tablet, personal digital assistant, or other similar mobile device.

Some implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for automatically generating a product video, the method comprising:
   receiving, via at least one processor, a product and a product identifier corresponding to the product;
   collecting, via the at least one processor, physical product data of the product;
   receiving, via the at least one processor, digital product data associated with the product identifier from at least one digital source;
   combining, via the at least one processor, the physical product data and the digital product data into a combined product data structure by providing a plurality of prompts associated with the product to an artificial intelligence (AI) model.;
   generating, via the at least one processor, a production plan based on the combined product data structure for recording the product video, wherein the production plan includes instructions for operating at least one equipment item; and
   automatically operating, via the at least one processor, the at least one equipment item to record content to be used in the product video by the production plan.

2. The method of claim 1, wherein collecting physical product data of the product includes collecting at least one scan of the product via at least one data collection device.

3. The method of claim 2, wherein the at least one data collection device includes a camera.

4. The method of claim 2, wherein the at least one scan includes a photo of the product.

5. The method of claim 2, wherein the at least one scan includes a photo of packaging associated with the product.

6. The method of claim 1, wherein receiving digital product data associated with the product identifier from the at least one digital source includes receiving digital product from a product database.

7. The method of claim 1, wherein receiving digital product data associated with the product identifier from the at least one digital source includes receiving digital product from a product website.

8. The method of claim 1, wherein the production plan includes a list of shots for recording the product video.

9. The method of claim 1, wherein the production plan includes a list of equipment items for recording the product video.

10. The method of claim 1, wherein the production plan includes instructions for operating the at least one equipment item.

11. The method of claim 1, further comprising:
    modifying, via the at least one processor, the plurality of prompts based on the physical and digital product data.

12. A system for automatically generating a product video, the system comprising:
    a plurality of equipment items;
    at least one memory for storing computer-executable instructions; and
    at least one processor for executing the instructions stored on the at least one memory, wherein execution of the instructions programs the at least one processor to perform operations comprising:
    receiving a product and a product identifier corresponding to the product;
    collecting physical product data of the product;
    receiving digital product data associated with the product identifier from at least one digital source;
    combining the physical product data and the digital product data into a combined product data structure by providing a plurality of prompts associated with the product to an artificial intelligence (AI) model.;
    generating a production plan for the product video based on the combined product data structure for recording the product video, wherein the production plan includes instructions for operating at least one equipment item; and
    the production plan automatically operating the at least one equipment item of the plurality of equipment items to record content to be used in the product video by the production plan.

13. The system of claim 12, further comprising:
    at least one data collection device, wherein collecting physical product data of the product includes collecting at least one scan of the product via the at least one data collection device.

14. The system of claim 13, wherein the at least one data collection device includes a camera.

15. The system of claim 13, wherein the at least one scan includes a photo of the product.

16. The system of claim 13, wherein the at least one scan includes a photo of packaging associated with the product.

17. The system of claim 12, wherein receiving digital product data associated with the product identifier from the at least one digital source includes receiving digital product from a product database.

18. The system of claim 12, wherein receiving digital product data associated with the product identifier from the at least one digital source includes receiving digital product from a product website.

19. The system of claim 12, wherein the production plan includes a list of shots for recording the product video.

20. The system of claim 12, wherein the production plan includes a list of equipment items for recording the product video.

21. The system of claim 20, wherein the list of equipment items includes at least a portion of the plurality of equipment items.

22. The system of claim 12, wherein the production plan includes instructions for operating the at least one equipment item.

23. The system of claim 12, wherein execution of the instructions programs the at least one processor to perform operations further comprising:
    modifying the plurality of prompts based on the physical and digital product data.

* * * * *